(12) United States Patent
Asahi et al.

(10) Patent No.: US 10,673,296 B2
(45) Date of Patent: Jun. 2, 2020

(54) FEEDING BODY FOR ROTARY ELECTRIC MACHINE (71) Applicant: HONDA MOTOR CO., LTD., Tokyo (JP)

(72) Inventors: Atsushi Asahi, Wako (JP); Yusuke Osumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 87 days.

(21) Appl. No.: 15/927,581

(22) Filed: Mar. 21, 2018

(65) Prior Publication Data

US 2018/0278113 A1 Sep. 27, 2018

(30) Foreign Application Priority Data

Mar. 23, 2017 (JP) .................................. 2017-057452

(51) Int. Cl.
*H02K 5/02* (2006.01)
*H02K 3/52* (2006.01)
(Continued)

(52) U.S. Cl.
CPC ................. *H02K 5/02* (2013.01); *H02K 3/50* (2013.01); *H02K 3/522* (2013.01); *H02K 3/525* (2013.01);
(Continued)

(58) Field of Classification Search
CPC .. H02K 3/00; H02K 3/08; H02K 3/22; H02K 3/32; H02K 3/44; H02K 3/50; H02K 3/52;
(Continued)

(56) References Cited

U.S. PATENT DOCUMENTS

2006/0063403 A1* 3/2006 Kataoka ................. H02K 3/522
439/76.2
2007/0178723 A1* 8/2007 Kataoka ................. H02K 3/50
439/76.2
(Continued)

FOREIGN PATENT DOCUMENTS

| JP | 2013-002880 A | 1/2013 |
| JP | 2013-042633 A | 2/2013 |
| JP | 2015-133873 A | 7/2015 |

OTHER PUBLICATIONS

Japanese Office Action with English translation dated Apr. 9, 2019, 7 pages.
Japanese Office Action dated Sep. 4, 2018, 4pages.

*Primary Examiner* — Tran N Nguyen
(74) *Attorney, Agent, or Firm* — Rankin, Hill & Clark LLP (57) ABSTRACT

Provided is a feeding body, for a rotary electric machine, capable of preventing short between a feeding body and a stator or the like caused by vibration or the like. A feeding body, for a rotary electric machine such as a motor and generator, includes: a power supply main body including a conductor such as copper; a terminal portion formed at one end of the power supply main body; and a protection portion made from a resin material molded to a connection part connected with the terminal portion on the power supply main body, wherein the protection portion includes a protrusion protruding toward a stator of the rotary electric machine.

5 Claims, 8 Drawing Sheets (51) Int. Cl.
 *H02K 5/24* (2006.01)
 *H02K 5/08* (2006.01)
 *H02K 5/22* (2006.01)
 *H02K 3/50* (2006.01)

(52) U.S. Cl.
 CPC ............... *H02K 5/08* (2013.01); *H02K 5/225* (2013.01); *H02K 5/24* (2013.01)

(58) Field of Classification Search
 CPC  H02K 3/522; H02K 5/00; H02K 5/02; H02K 5/14; H02K 5/22; H02K 5/225; H02K 5/24; H01R 9/00; H01R 9/24; H01R 9/241; H01R 9/2416; G01K 7/22
 See application file for complete search history.

(56) References Cited

U.S. PATENT DOCUMENTS

| | | | |
|---|---|---|---|
| 2010/0020516 A1* | 1/2010 | Kishino | H05K 1/144 361/803 |
| 2013/0113313 A1* | 5/2013 | Ikura | H02K 3/522 310/71 |
| 2014/0113472 A1 | 4/2014 | Chamberlin et al. | |
| 2016/0336829 A1 | 11/2016 | Haruno et al. | |

\* cited by examiner

FEEDING BODY FOR ROTARY ELECTRIC MACHINE

CROSS REFERENCE TO RELATED APPLICATION

The present application is based on Japanese application JP 2017-057452 filed on Mar. 23, 2017, the content of which is hereby incorporated by reference into this application.

BACKGROUND OF THE INVENTION

Field of the Invention

The present invention relates to a feeding body that connects respective phase coils of a rotary electric machine and outside.

Description of the Related Art

In a rotary electric machine, conductors are connected to coils of respective phases so that electrical power is delivered between outside and the coils of the respective phases through the conductors.

For example, Patent Document 1 (JP 2015-133873 A) discloses a structure in which the peripheries of conductors corresponding to respective phases are protected by an insert mold.

If a rotary electric machine, to which feeding bodies disclosed by Patent Document 1 are fitted, vibrates in the axial direction, the feeding bodies may sometimes collide against a stator or the like so that a short occurs.

SUMMARY OF THE INVENTION

An aspect of the present invention provides a feeding body, for a rotary electric machine, capable of preventing a short between a feeding body and a stator or the like caused by vibration or the like.

An aspect of the present invention provides a feeding body for a rotary electric machine, comprising:
a power supply main body including a conductor;
a terminal portion formed at one end of the power supply main body; and
a protection portion molded to a connection part connected with the terminal portion on the power supply main body, wherein the protection portion includes a protrusion protruding toward a stator.

According to the present invention, it is possible to provide a feeding body, for a rotary electric machine, capable of preventing a short caused by vibration or the like.

BRIEF DESCRIPTION OF THE DRAWINGS

FIGS. 7A and 7B show a state that a clip is fitted to a part where a power supply main body and a terminal portion in a second embodiment are connected with each other, and further a cover portion is molded, wherein FIG. 7A is a perspective view, and FIG. 7B is a cross-sectional view taken along line VII-VII in FIG. 7A;

FIGS. 8A and 8B show the part where the power supply main body and the terminal portion in the second embodiment are connected with each other, wherein FIG. 8A is a perspective view, and FIG. 8B is a cross-sectional view taken along line VIII-VIII in FIG. 8A;

FIGS. 9A and 9B show the state that the clip is fitted to a part where the power supply main body and the terminal portion in the second embodiment are connected with each other, wherein FIG. 9A is a perspective view, and FIG. 9B is a cross-sectional view taken along line IV-IV in FIG. 9A.

PREFERRED EMBODIMENTS OF THE INVENTION

A first embodiment of the present invention will be described in detail, referring to the drawings. Incidentally, in the description, the same symbols will be given to the respective same elements, and overlapping description will be omitted.

Figure 1:
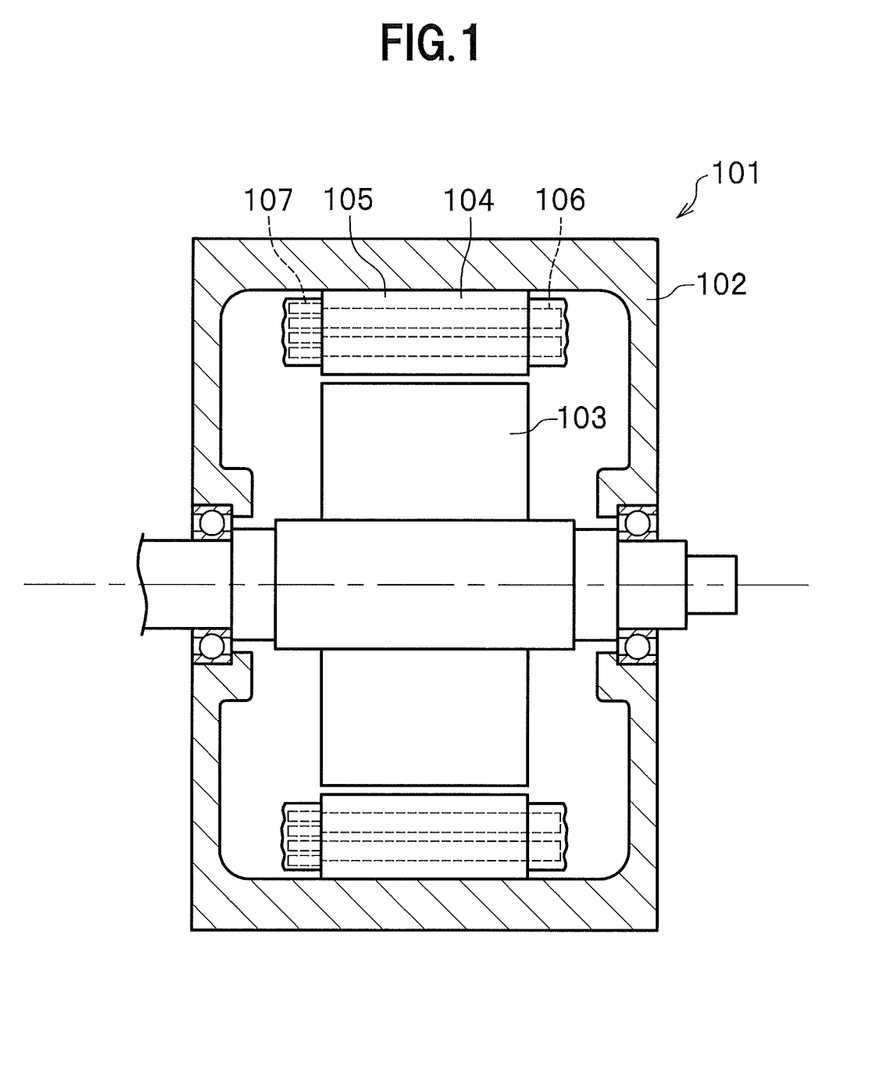
FIG. 1 is a cross-sectional view showing a rotary electric machine in a first embodiment.

FIG. 1 is a schematic structure diagram (cross-sectional view) showing the entire structure of a rotary electric machine 101 including a feeding unit in the present embodiment. The rotary electric machine 101 is mounted on a vehicle, for example, a hybrid vehicle or an electric vehicle, and functions as a driving motor when a power is supplied from outside and functions as an electric power generator in regenerative braking.

Incidentally, without being limited to the rotary electric machine 101, a feeding unit in the present invention can be also applied to a fixed motor, a motor for a different purpose, or a power generator.

Up/down in the description refers to up/down in the figure, and not up/down in a state that the rotary electric machine 101 is installed in a vehicle.

As shown in FIG. 1, the rotary electric machine 101 is provided with a casing 102, a rotor 103, and a stator 104.

The casing 102 is substantially in a cylindrical shape whose both ends are closed, and a cylindrical space is formed therein.

The rotor 103 is axially supported such as to be rotatable around the axially central portion of the casing 102.

Figure 2:
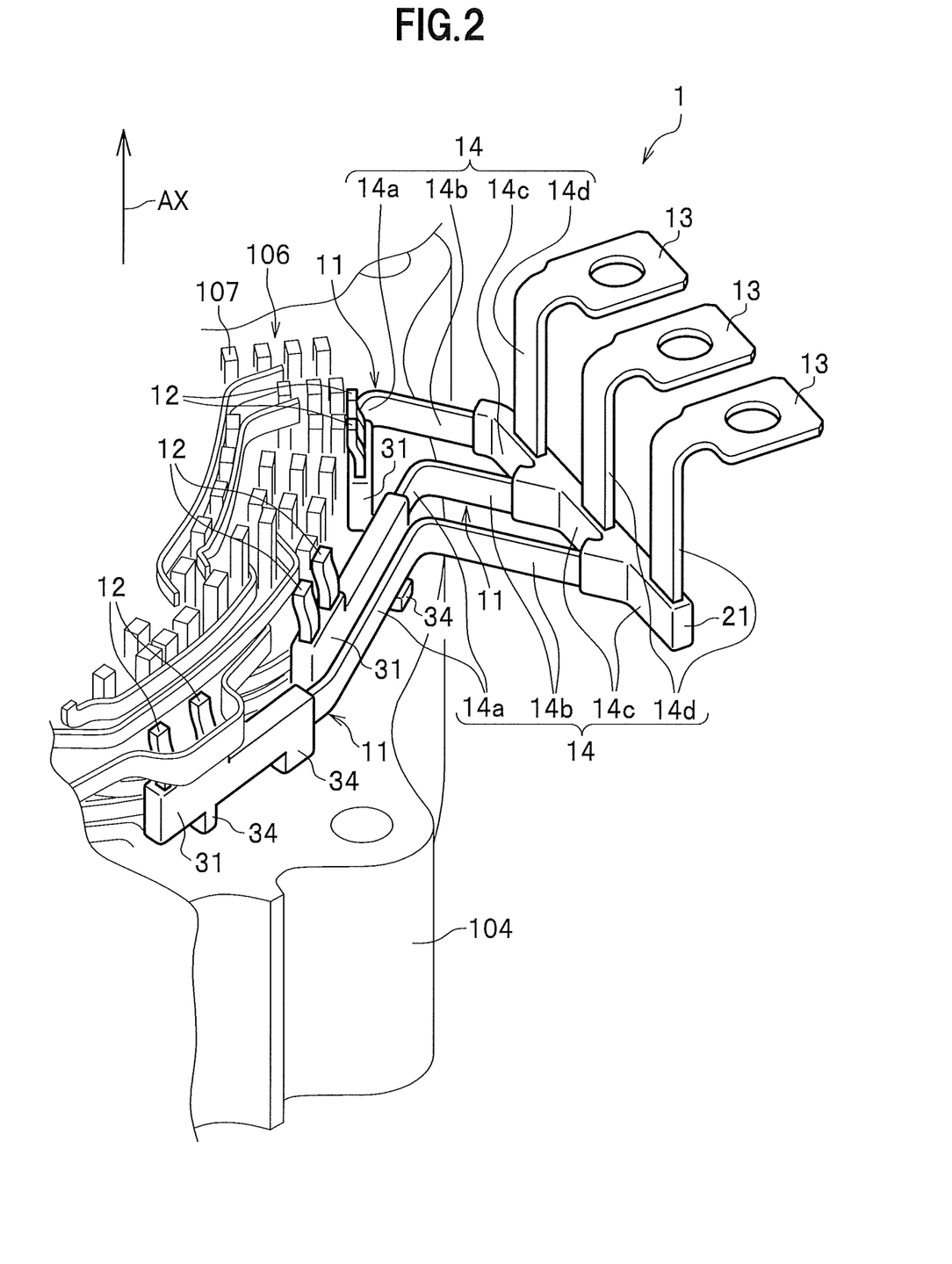
FIG. 2 is a perspective view showing a feeding unit in the first embodiment.

The stator 104 is, as shown in FIGS. 1 and 2, in a cylindrical shape, and as shown in FIG. 1, the rotor 103 is arranged in the cylinder.

The stator 104 is, as shown in FIG. 2, provided with a stator core 105 and coils 106 attached to the stator core 105.

The stator core 105 is provided with a cylindrical core main body and teeth, and is substantially in a cylindrical shape.

The core main body is fixed to the inside of the casing 102 by fitting engagement or the like.

The teeth are protrusions in a pectinate shape protruding radially inward from the inner circumferential surface of the core main body at certain intervals. The gaps between teeth neighboring each other in the circumferential direction are set to be slots.

The slots penetrate thorough the stator core 105 in the axial direction, and conductors 107 forming the coils 106 are inserted therein.

The coils 106 are three-phase coils formed by distribution winding of the conductors 107 for the three phases of U-phase, V-phase, and W-phase. The coils 106 of the respective phases in the present embodiment are formed by connecting corresponding plural segment coils 106 to each other.

The each segment coil 106 is wound around the stator core 105 while the conductor 107 is inserted in a certain slot. The segment coils 106 of the same phase are joined with each other by TIG welding, laser welding, or the like in either side in the axial direction of the stator core 105.

Incidentally, the structure of the coils 106 can be modified, as appropriate. For example, the coils 106 are not limited to the segment coils 106, and may be attached to the stator core 105 by concentration winding such as to winding coils around the teeth.

Further, on the stator 104, as shown in FIG. 2, a feeding unit 1 structured with feeding bodies 11 is arranged so as to electrically connect the coil 106 and an external power circuit (not shown).

Figure 3:
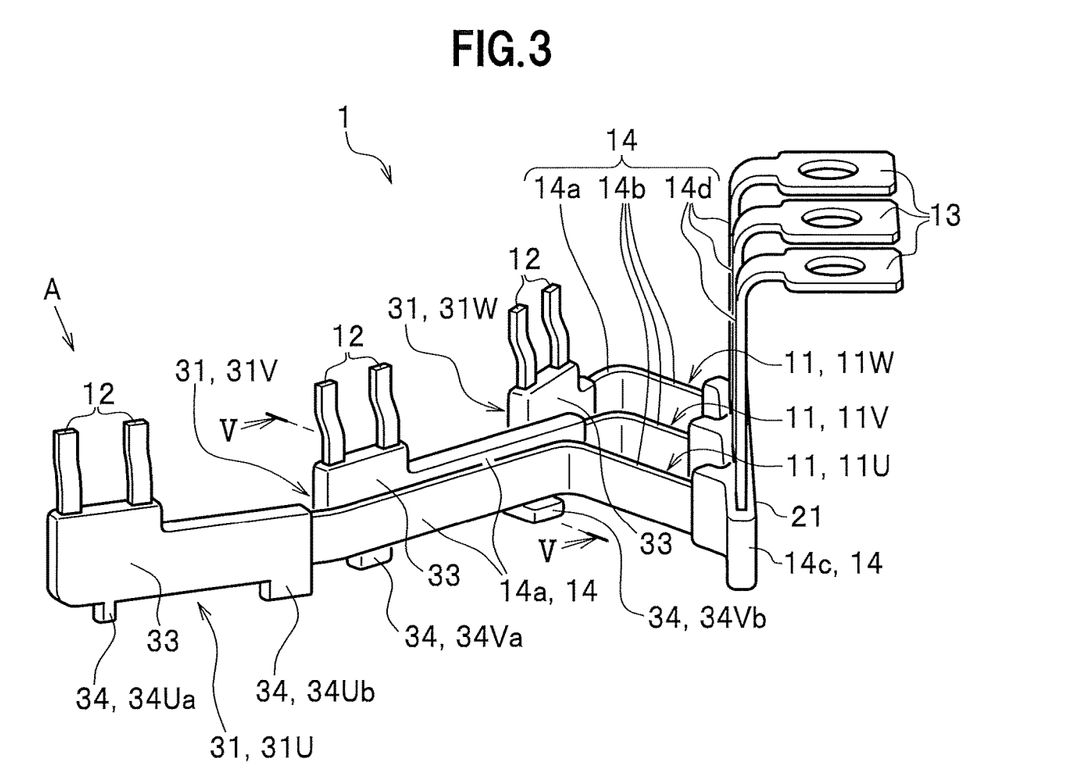
FIG. 3 is a perspective view of a feeding body in a view from an outer circumferential side of the rotary electric machine, in the first embodiment.

The feeding unit 1 is, as shown in FIG. 2 and FIG. 3, provided with three feeding bodies 11 corresponding to the respective phases U-phase, V-phase, and W-phase, and a resin holding portion 21 that integrally connects and holds the feeding bodies 11.

The respective feeding bodies 11 are formed by bus bars formed in a three-dimensional shape by sheet-metal processing of a conductive plate material, such as a metal (for example copper).

Each feeding body 11 includes a coil-side terminal 12, an external-side terminal 13 and a power supply main body 14.

Incidentally, the surfaces of the feeding bodies 11 have been subjected to plate processing. By performing plate processing, stabilization of the axial force and the contact resistance of the terminal portion is attained, and inhibiting of corrosion of the power supply main body 14 caused by water, ATF, or the like is attained.

The coil-side terminals 12 (terminal portion) are arranged along the outer circumference of the stator 104 such as to be connectable with the conductors 107 forming the coils 106 of the corresponding phase.

The external-side terminals 13 are arranged such as to be connectable with a terminal table (not shown) of an external power circuit (not shown), which is separately set outside the rotary electric machine 101.

The power supply main bodies 14 are formed in shapes which are different corresponding to the respective feeding bodies 11 such as to connect the coil-side terminals 12 connected to the coils 106 and the external-side terminals 13 connected to the terminal table, without a contact with the feeding bodies 11 of the other phases. As shown in FIG. 3, the power supply main body 14 includes a curved portion 14*a*, a drawn-out portion 14*b*, a direction-change portion 14*c*, and an extension portion 14*d*.

Further, for the power supply main body 14, as shown in FIG. 3, the connection part connected with the coil-side terminal 12 is covered by a coil-side protection portion 31 as a protection portion.

The each curved portion 14*a* is, as shown in FIG. 3, connected at the inner end thereof with the coil-side terminal 12 and disposed such as to match with the outer circumference of the stator 104.

The each drawn-out portion 14*b* is connected to the outer end of the curved portion 14*a* and extends toward radially outer side of the rotary electric machine 101. The angle of the each drawn-out portion 14*b* with respect to the curved portion 14*a* is set such that the respective drawn-out portions 14*b* of the three phases are located substantially at an equal distance from each other and substantially in parallel to each other.

The each direction-change portion 14*c* is connected at the inner end thereof with the outer end of the drawn-out portion 14*b*, and changes the direction thereof so that the plate surfaces of the respective bus bars of the three phases are arrayed on the same plane.

The each extension portion 14*d* extends such that the direction of the plate surface of the bus bar remains the same as the direction of the plate surface of the direction-change portion 14*c*, and extends in the axial direction AX (the upper/lower direction in FIG. 2) of the rotary electric machine 101 to connect the direction-change portion 14*c* and the external-side terminal 13.

As shown in FIG. 2, each of the coil-side protection portion 31 (protection portion) protects the connection part between the coil-side terminal 12 and the power supply main body 14 so that the feeding body 11 as a draw-out line 11 does not contact with the stator core 105, the coil 106, or the like. For this purpose, the dimensions of the respective portions and the material of the coil-side protection portion 31 are set so that spark discharge, short, or the like is not caused by a voltage applied to the feeding body 11. Further, the coil-side protection portion 31 is provided with a protrusion 34 protruding toward the stator 104 (along the axial direction AX).

The protrusions 34 protrude to the side (downward in FIG. 3 and FIG. 4) opposite to the coil-side terminal 12 with the power supply main body 14 in between. The shape and number of the protrusions 34 are variously set, corresponding to the shapes and the like of the coil-side protection portions 31.

At the coil-side protection portion 31U of a feeding body 11U in front in FIG. 3 in the present embodiment is provided with two protrusions, namely, protrusions 34Ua and 34Ub substantially in prism shapes. These protrusions 34Ua and 34Ub are set such as to have different width lengths L34 (the dimension in the longitudinal direction of the power supply main body 14).

Further, a coil-side protection portion 31V of a feeding body 11V at the center of FIG. 3 is also provided with two protrusions 34Va, 34Vb.

Figure 5:
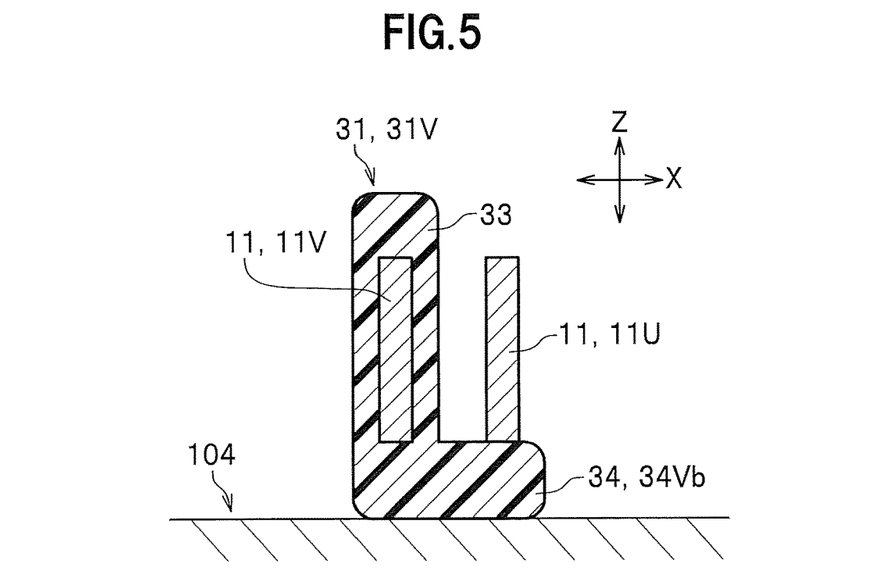
FIG. 5 is a cross-sectional view taken along line V-V in FIG. 4.

The one protrusion 34Va is substantially in a prism shape similarly to the above-described protrusions 34Ua, 34Ub. The other protrusion 34Vb extends, as shown in FIG. 3 and FIG. 5, such as to be sandwiched by the adjacent feeding body 11U in front and the stator 104.

Further, on a feeding body 11W in the deep of FIG. 3, a coil-side protection portion 31W is provided with one protrusion (not shown) substantially in a prism shape.

Figure 4:
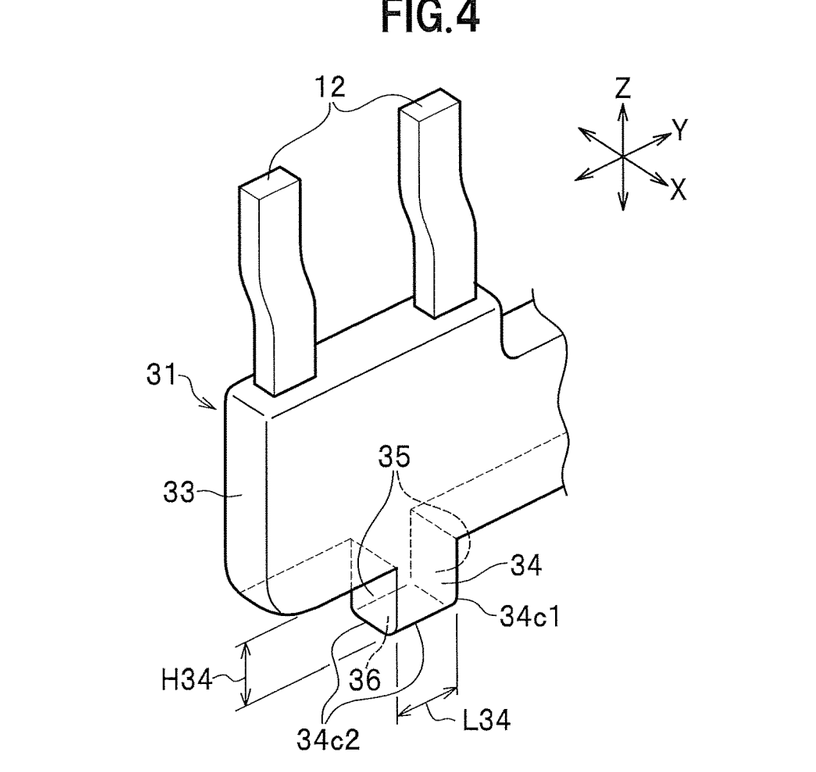
FIG. 4 is a main part enlarged view showing a portion A in FIG. 3.

Incidentally, the respective protrusions 34 are made of the same resin material as that of the coil-side protection portion 31, and are formed integrally with the coil-side protection portion 31 in forming the coil-side protection portion 31. As shown in FIG. 4, the respective protrusions 34 are chamfered or rounded at edge portions 34*c*1 and marginal portions 34*c*2 thereof.

The protrusions 34 are provided with a pair of grip surfaces 35 facing each other back to back.

Figure 6:
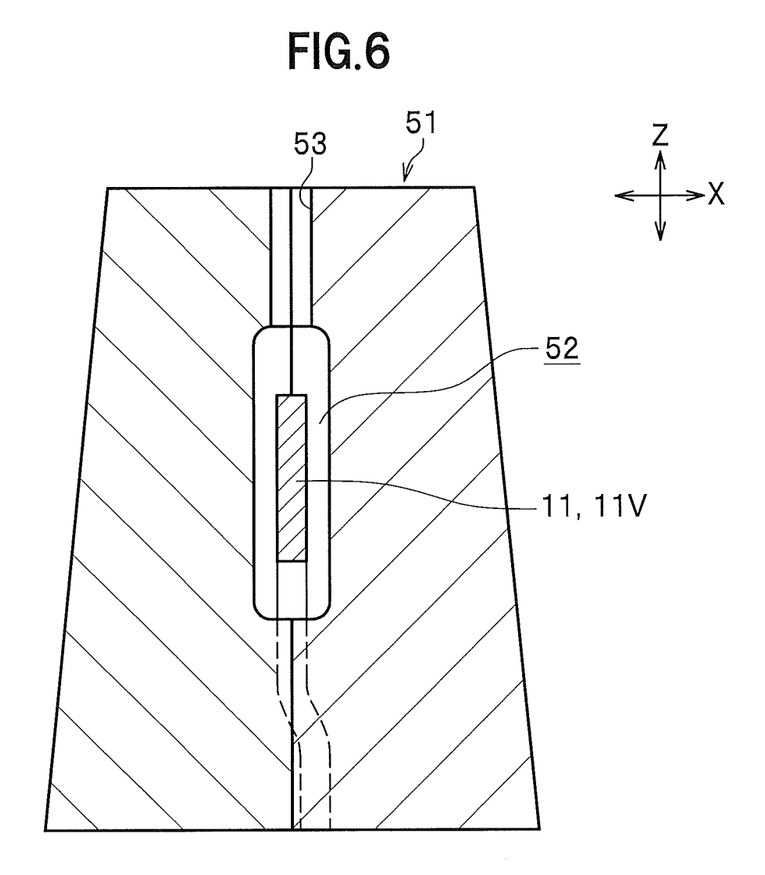
FIG. 6 is a cross-sectional view showing a mold for insert molding of a protection portion in the first embodiment.

In the following, a mold 51 for forming the cover portion 33 will be described.

FIG. 6 shows a mold 51 for forming the coil-side protection portion 31V for the feeding body 11V at the center.

The mold 51 in the present embodiment, a feeding body 11 is arranged such as to be in upper/lower reverse to the FIG. 3 and FIG. 4.

A pouring gate sprue 53 is open at the ceiling surface of the mold 51 and communicates with a part of a cavity 52 forming a stator side end surface 36 (see FIG. 4) of the protrusion 34.

In the following, a manufacturing process of the feeding unit 1 will be described.

First, a feeding body 11 is cut out from a material in a plate shape and formed to have a predetermined shape.

Subsequently, the surface of the feeding body 11 is subjected to plate processing.

Then, the coil-side protection portion 31 is molded to the feeding body 11 having been subjected to the plating process (completion of the feeding body 11).

Further, resin holding portions 21 are molded to the respective feeding bodies 11 so that the three feeding bodies 11 are united into one.

Through the above process, the feeding unit 1 is completed.

In the following, the operation and effect of a feeding body 11 in the present embodiment will be described.

In the present embodiment, a coil-side protection portion 31 (protection portion) is provided with a protrusion 34 protruding toward the stator 104.

Thus, the feeding body 11 can be held in a state of being off by a height dimension H34 (see FIG. 4) of the protrusion 34.

In such a manner, a sufficient insulation distance is ensured so that collision and short between the feeding body 11 and the stator 104 can be prevented even in case that the rotary electric machine 101 vibrates and the feeding body 11 vibrates in axial direction AX.

In the present embodiment, the coil-side protection portion 31 and the protrusion 34 are formed from the same resin material, and the protrusion 34 is integrally formed with the coil-side protection portion 31 when the coil-side protection portion 31 is molded.

Thus, as the protrusion 34 can be given sufficient fitting strength, compared with a case of forming the protrusion from a material different from that of the coil-side protection portion. Accordingly, short can be more stably prevented.

In the present embodiment, the edge portions 34c1 and the marginal portions 34c2 of the respective protrusions 34 are chamfered or rounded (see FIG. 4).

Thus, point contact of the protrusions 34 with the stator 104 is prevented. By the prevention of point contact, abrasion of the protrusions 34 occurring in collision with the stator 104 caused by vibration of the rotary electric machine 101 can be suppressed.

In the present embodiment, the protrusions 34 of which the number corresponds to that of the formed feeding body 11, are formed on the coil-side protection portion 31.

Thus, corresponding to the dimensions and the like of the respective parts of the feeding body 11, an appropriate number of protrusions 34 can be set at appropriate positions on the coil-side protection portion 31.

Further, in the present embodiment, corresponding to the formed feeding body 11, the width dimensions L34 of the protrusions 34 are set.

Thus, for example, a large width dimension can be set for a protrusion at a part where the contact width by vibration is large, and a small width dimension can be set for a protrusion at a part where the contact width is small. In such a manner or the like, the protrusions 34 can be set, corresponding to the parts where the protrusions 34 are provided.

In the present embodiment, a protrusion 34 is provided with a pair of grip surfaces facing each other back to back.

By such a structure, in fitting a feeding body 11 to the stator 104, it is possible to grip the feeding body 11 by the pair of grip surfaces 35 to perform positioning.

Thus, the accuracy of the position to install the feeding body 11 can be improved.

Further, the grip surfaces 35 are set on the protrusion 34 protruding on the side opposite to the coil-side terminal 12 with the power supply main body 14 in between.

Consequently, a distance is made between the part for gripping the feeding body 11 and the coil-side terminal 12 joined with the conductor 107 on the stator 104 side.

Thus, it is possible to attain both accurate positioning and stable joining work.

In the present embodiment, the tip end part of the protrusion 34Vb extends such as to be sandwiched between the adjacent front-side feeding body 11U and the stator 104 (see FIG. 5).

Thus, the coil-side protection portion 31 can prevent occurrence of short between the stator 104 and the part of the power supply main body 14, the part being not molded.

Incidentally, the power supply main body 14 is not limited to a conductor formed by a bus bar, and can be formed by a conductor in various types. For example, the power supply main body 14 can be formed by binding plural conductive wires with a circular cross-section. Even when such conductive wires are used, operation and effect similar to those of a bus bar can be obtained.

Further, although in the present embodiment, a protrusion 34 is substantially in a prism shape, the invention is not limited thereto. For example, the protrusion may have a half-spherical shape, by which it is also possible to obtain a similar operation and effect as in the above-described embodiment.

Further, although, in the present embodiment, as a protrusion 34, one part of a coil-side protection portion 31, the part facing the stator 104, protrudes toward the stator 104, the invention is not limited thereto. For example, as the protrusion, the whole part of the coil-side protection portion 31, the part facing the stator 104, can be made protrude, by which it is also possible to obtain a similar action and effect.

In the following, a second embodiment of the invention will be described in detail, referring to the drawings. Incidentally, in the description, the same elements as those in the first embodiment will be given with the same symbols, and overlapping description will be omitted.

Figure 7A:
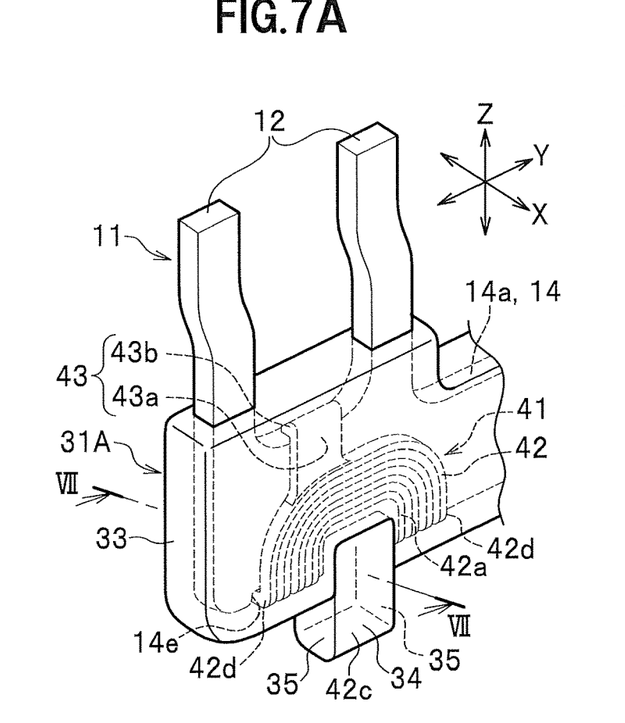
Figure 7B:
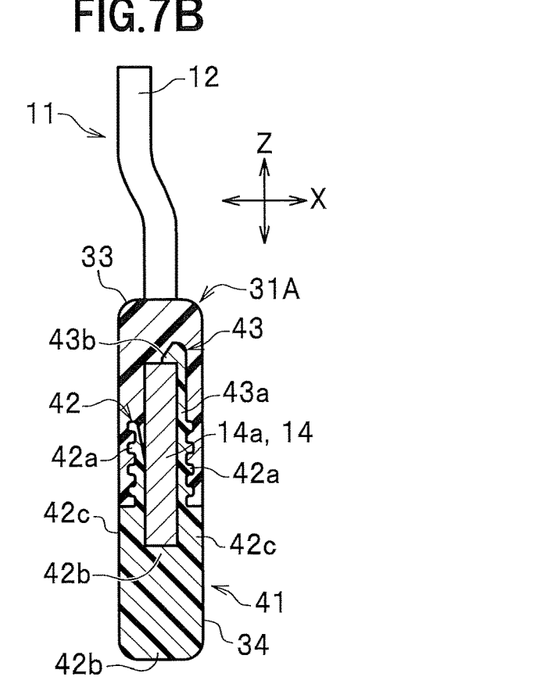

As shown in FIGS. 7A and 7B, a significant difference of the present embodiment from the above-described first embodiment is the structure of a coil-side protection portion 31A.

The coil-side protection portion 31A in the present embodiment is formed by molding a resin material to a power supply main body 14 to which a clip 41 having a protrusion 34 is fitted.

Incidentally, in order to position the clip 41, position restricting portions 14e are provided to the curved portion 14a of a power supply main body 14 in the present embodiment.

Figure 8A:
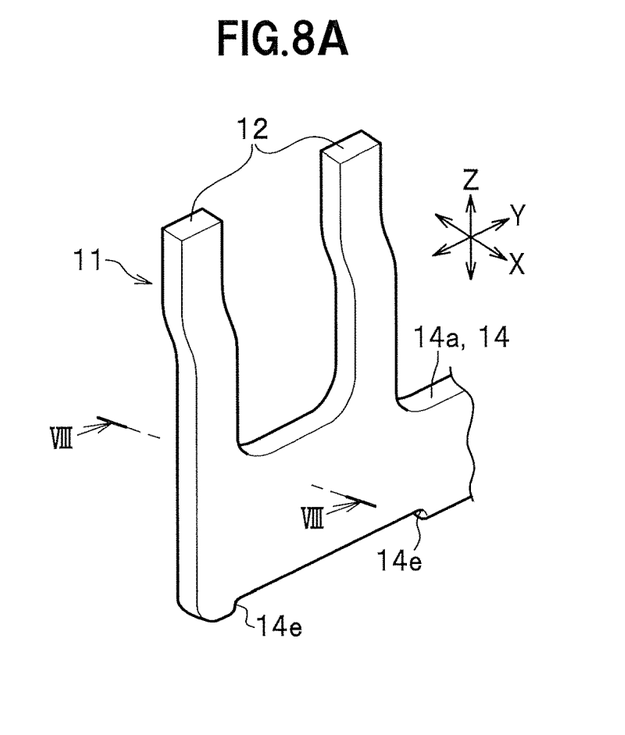
Figure 8B:
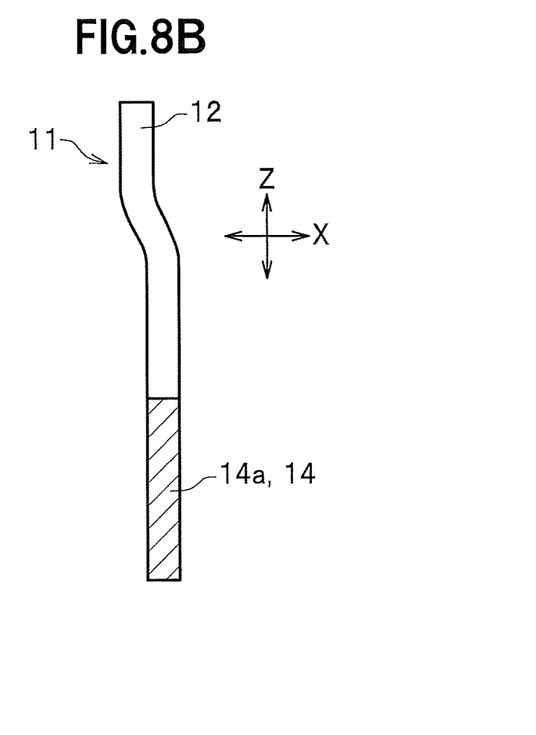

As shown in FIGS. 8A and 8B, the position restricting portions 14e are formed by a pair of wall portions which face each other and form a recessed portion substantially in a C-shape, the wall portions being formed at the lower marginal portion of a part of the curved portion 14a, the part being connected to the coil-side terminals 12. As shown in 9A and 9B, the position restricting portions 14e engage with a later-described clip 41 when the clip 41 is fitted to the power supply main body 14, and positions the clip 41 in Y direction.

As shown in FIGS. 7A and 7B, the coil-side protection portion 31A is structured by the clip 41 fitted to the power supply main body 14, and a cover portion 33 formed by insert-molding with a resin material to cover the surround of the fitted clip 41 and the power supply main body 14.

Incidentally, the clip 41 and the cover portion 33 are formed from the same resin material.

Figure 9A:
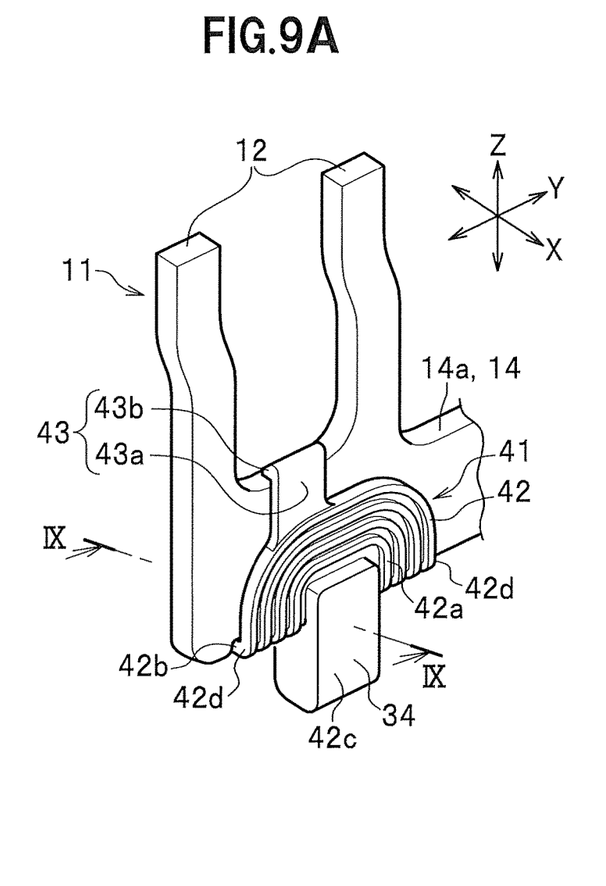
Figure 9B:
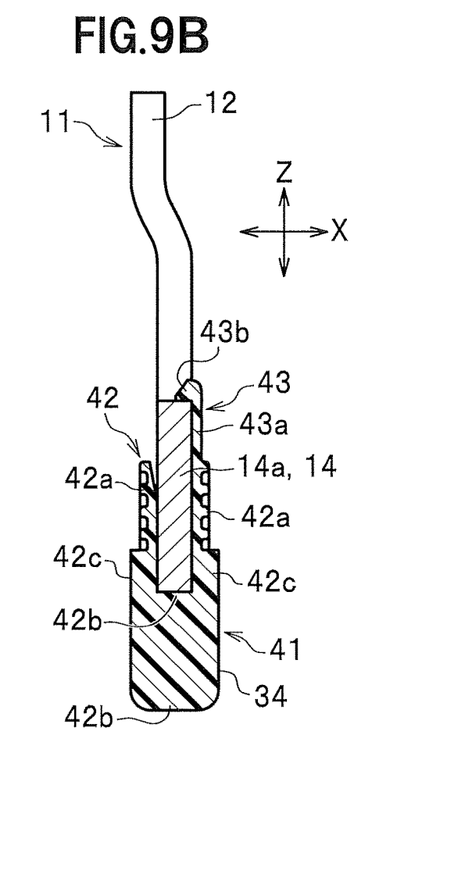

The clip 41 is, as shown in FIGS. 9A and 9B, provided with the clip main body 42 and an engagement stop claw 43.

The clip main body 42 has a cross-section substantially in a U-shape formed by a pair of slide contact pieces 42a facing each other and a connecting piece 42b connecting the end margins of the respective slide pieces 42a. Further, the clip main body 42 is provided with a clamp portion 42c.

The slide contact pieces 42a have a gap between facing surfaces to be the same as the plate thickness of the bus bar. The bus bar is inserted in the slide contact pieces 42a without a gap inbetween.

The both end portions of the connecting piece 42b are set to be restricted portions 42d. The connecting piece 42b fits between the position restricting portions 14e of the power supply main body 14 without a gap, and the respective restricted portions 42d engage with the corresponding position restricting portions 14e in direction Y.

The clamp portion 42c is formed by a protrusion, with a cross-section substantially in a U-shape, straddling from the central portion of the outer surface side lower marginal portion of one slide contact piece 42a along the outer surface of the connecting piece 42b to the central portion of the outer surface side lower end portion of the other slide contact pieces 42a, and protruding outward.

Further, the clamp portion 42c is integrally provided with the protrusion 34 substantially in a prism shape.

The engagement stop claw 43 (for engaging) extends upward (direction Z) from the upper margin of one slide contact piece 42a. The engagement stop claw 43 is provided with an elastic arm portion 43a and a hook portion 43b.

The elastic arm portion 43a is formed such as to be able to warp in the plate thickness direction (direction X) of the bus bar.

The hook portion 43b is arranged at the tip end of the elastic arm portion 43a such as to be able to engage with the upper marginal portion of the power supply main body 14.

In the following, a procedure of fitting the clip 41 will be described.

As shown in FIGS. 8A, 8B, 9A, and 9B, first, while fitting the lower marginal portion of the power supply main body 14 into the U-shape recession of the clip main body 42, the clip 41 is slid from the below to the above. Herein, the engagement stop claw 43 moves while the elastic arm portion 43a warps and the hook portion 43b moves on the plate surface of the power supply main body 14.

Then, when the connecting piece 42b reaches the lower marginal portion of the power supply main body 14, the elastic arm portion 43a elastically turns into the original state, and the hook portion 43b engages with the upper margin of the power supply main body 14.

In such a manner, the clip 41 is fitted to the power supply main body 14.

The clip 41 fitted to the power supply main body 14 by this procedure is restricted in moving on the power supply main body 14.

That is, movement restriction in the plate thickness direction (direction X) is carried out by that the slide contact pieces 42a facing each other contact with the plate surfaces of the power supply main body 14.

The movement restriction of the power supply main body 14 in the extending direction (direction Y) is carried out by that the both end portions of the connecting piece 42b, which are the restricted portions 42d, engage with the corresponding position restricting portions 14e.

Regarding movement restriction in the upper/lower direction (direction Z), movement restriction in the upper direction is carried out by that the connecting piece 42b contacts with the lower marginal portion of the power supply main body 14, and movement in the lower direction is carried out by that the engagement stop claw 43 engages with the upper margin of the power supply main body 14.

Figure 10:
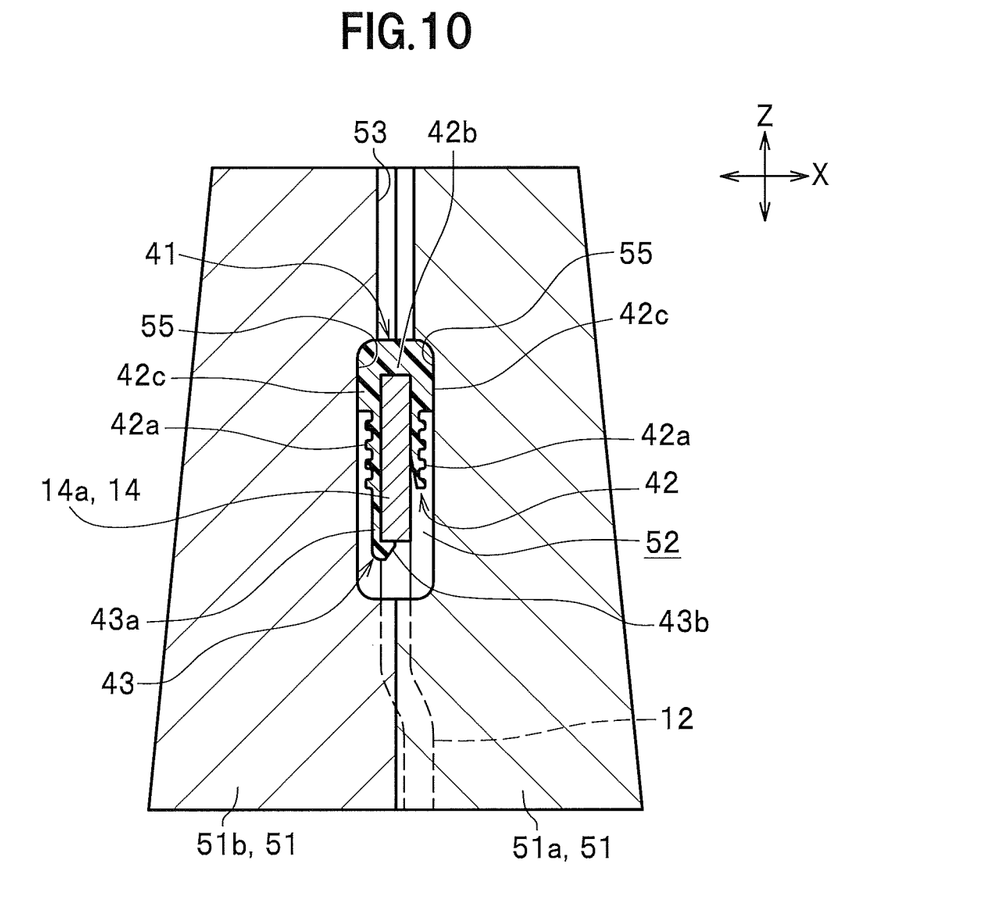
FIG. 10 is a cross-sectional view showing a mold for insert molding of a protection portion in the second embodiment.

As shown in FIG. 10, the cover portion 33 is molded in a state that the clamp portion 42c set to the clip 41 is sandwiched by the mold 51, and the power supply main body 14 is positioned, together with the clip 41, inside the cavity 52 of the mold 51.

That is, the cover portion 33 covers the connection part connecting the power supply main body 14 and the coil-side terminals 12, covering also the position restricting portions 14e for performing movement restriction of the clip 41.

The cover portion 33 is molded such that the surface thereof is fitted to the same plane as the surface of the clamp portion 42c.

As shown in FIG. 2 and FIG. 3, the resin holding portion 21 is formed by molding with a resin material having insulation. The resin holding portion 21 holds the respective coil-side terminals 12 of three phases at positions connectable with certain conductors 107; holds the positions of the respective external-side terminals 13 of three phases to the positions on the terminal table (not shown) and thus connects the external-side terminals 13.

In the following, a procedure of molding will be described. First, as shown in FIGS. 8A and 8B, the clip 41 is fitted to the power supply main body 14 by the above-described procedure (see FIG. 9). Subsequently, together with the fitted clip 41, the power supply main body 14 is disposed in the cavity 52 of a fixed mold 51b (see FIG. 10).

Then, a movable mold 51a is placed on the fixed mold 51b and the cavity 52 is thereby closed. Herein, a sandwiching portion 55 comes into contact with the clamp portion 42c of the clip 41, and the curved portion 14a is fixed in the cavity 52 through the clamp portion 42c.

Subsequently, molten resin is injected into the cavity 52 through the pouring gate sprue 53.

Thereafter, the molten resin cools down, and when the molten resin gets solidified, the feeding body 11 is moved out from the mold 51 so that the feeding body 11 is finished (see FIG. 7).

In the following, the action and effect of the feeding body 11 in the present embodiment will be described.

In the present embodiment, the clip 41 is fitted to the power supply main body 14, and a resin is molded from above the clip 41 so that the coil-side protection portion 31A (protection portion) is formed.

Thus, it is possible to reduce a drop in the position accuracy of the tip end portion of the coil-side terminal 12, the drop being caused by molding the coil-side protection portion 31A to a part of the power supply main body 14, the part being located adjacent to the coil-side terminal 12.

The invention claimed is:
1. A feeding unit for a rotary electric machine, comprising:

a plurality of feeding bodies, each of the plurality of feeding bodies corresponding to a different phase and comprising a power supply main body including a conductor, wherein a terminal portion is formed at one end of the power supply main body of one of the plurality of feeding bodies, a protection portion is molded on a connection part of the terminal portion of the power supply main body, and the protection portion includes a plurality of protrusions protruding toward a stator, one protrusion of the plurality of protrusions having a first width different from a second width of another protrusion of the plurality of protrusions, the one protrusion being sandwiched between the stator and the power supply main body of another of the plurality of feeding bodies.

2. The feeding body for a rotary electric machine according to claim 1, wherein the plurality of protrusions are:

made of same resin material as the protection portion; and formed integrally with the protection portion when the protection portion is formed.

3. The feeding body for a rotary electric machine according to claim 1, wherein the protection portion includes:

a clip fitted to the power supply main body; and a cover portion covering the clip which is formed by molding into a state that a clamp portion of the clip is sandwiched by a mold, and the power supply main body is disposed in a cavity of the mold, and wherein the clip and the cover portion are made of a same resin material.

4. The feeding body for a rotary electric machine according to claim 1, wherein at least one of the plurality of protrusions is substantially in a prism shape, and wherein an edge portion and a marginal portion thereof are chamfered or rounded.

5. The feeding body for a rotary electric machine according to claim 1, wherein the each of the plurality of protrusions is provided with a pair of grip surfaces facing each other back to back.

* * * * *